June 30, 1959 H. W. LAU 2,892,640
SEWN-IN-SLACK METHOD OF WEBBING FABRICATION
AND THE TOWING ARTICLE PRODUCED THEREBY
Filed Sept. 4, 1957 3 Sheets-Sheet 1
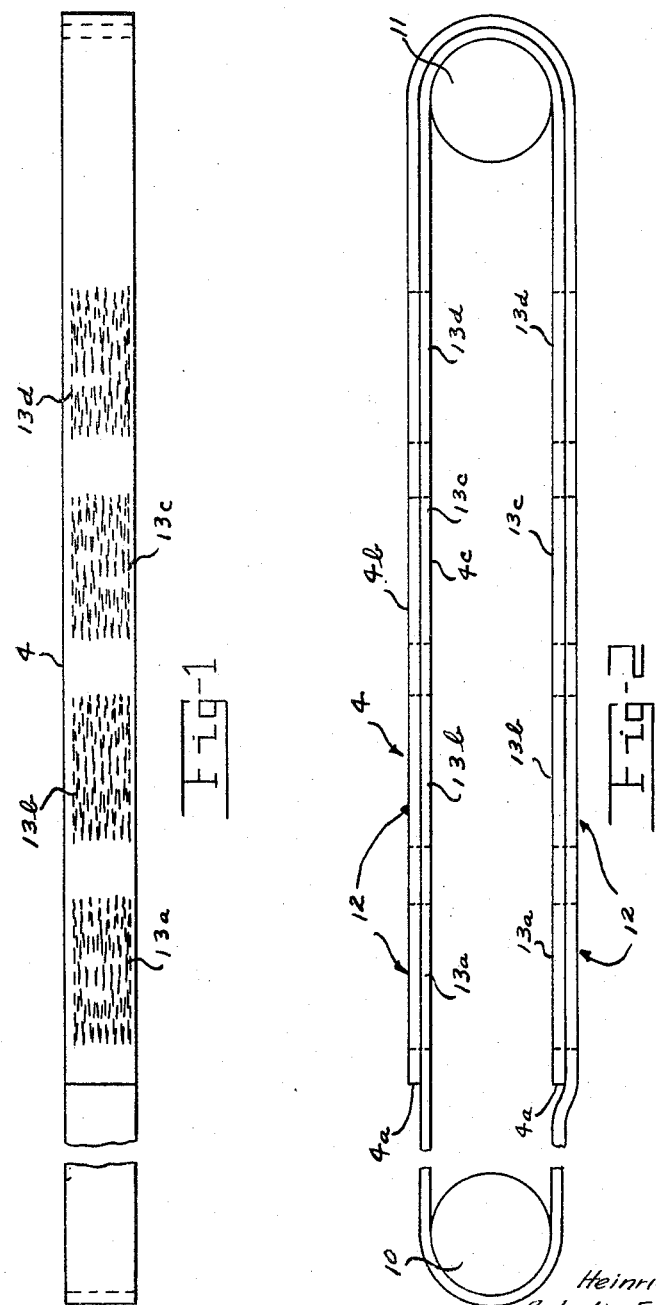
INVENTOR
Heinrich W. Lau, Deceased,
By Lydia E. Lau, Administratrix
BY
ATTORNEY
AGENT

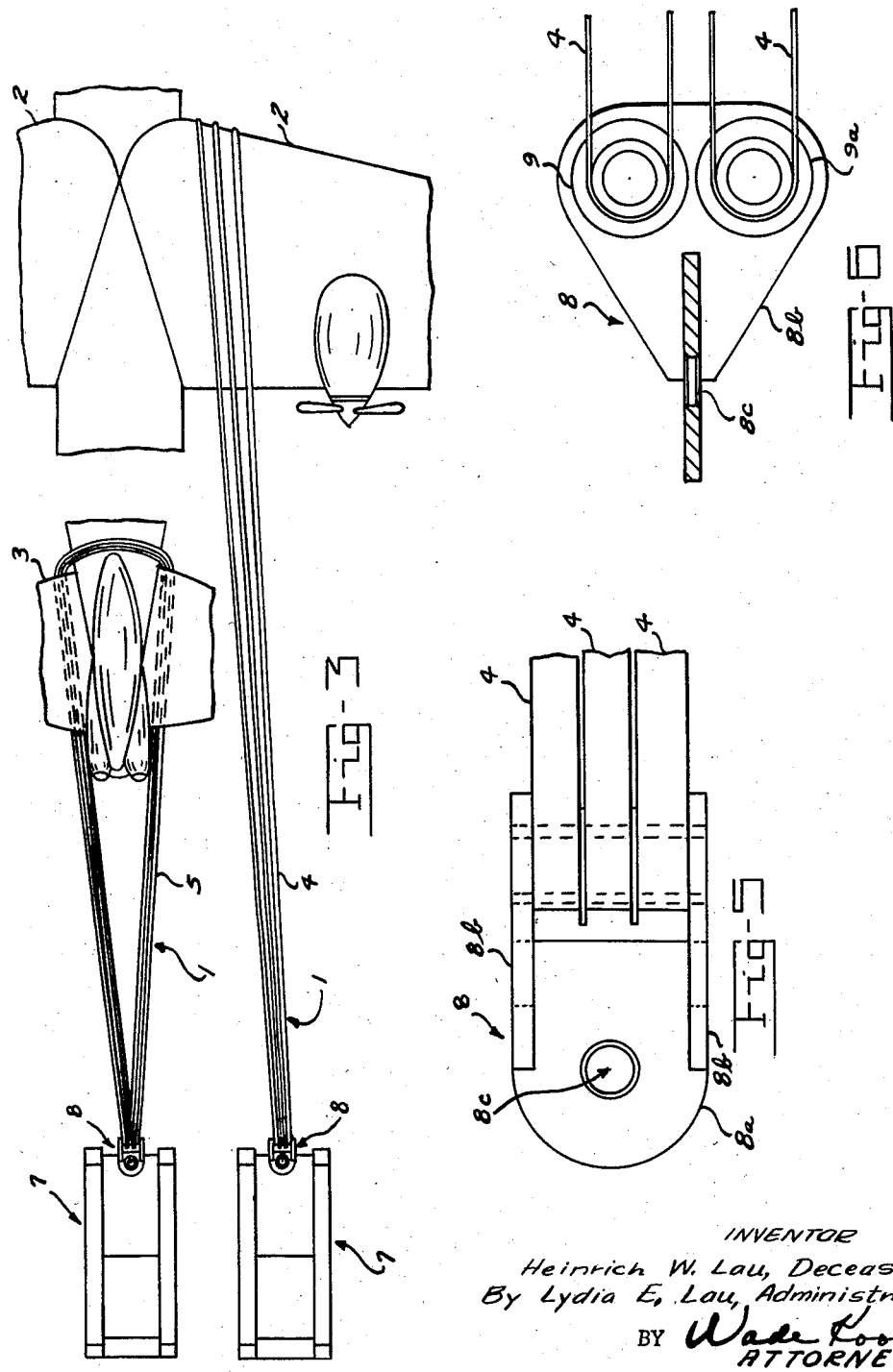

়
2,892,640

SEWN-IN-SLACK METHOD OF WEBBING FABRICATION AND THE TOWING ARTICLE PRODUCED THEREBY

Heinrich W. Lau, deceased, late of Alamogordo, N. Mex., by Lydia E. Lau, administratrix, Alamogordo, N. Mex.

Application September 4, 1957, Serial No. 682,262

5 Claims. (Cl. 280—480)

(Granted under Title 35, U.S. Code (1952), sec. 266)

The invention described herein may be manufactured and used by or for the United States Government for governmental purposes without payment of any royalty thereon.

This invention relates generally to a method of fabricating high tensile strength webbing and, more particularly, to a method of stitching together two layers of said webbing.

In the recovery of crashed aircraft, high tensile strength webbing is utilized as the connecting link between said aircraft and the vehicle for pulling and/or lifting said aircraft from the runway or crash area. At the present time, no machine is available that would satisfactorily sew more than two thicknesses of webbing at the same time. The method of stitching heretofore used was found to be unsatisfactory in that it fails at a force less than that of the maximum strength of the webbing being used. The present invention, therefore, effects a new method of stitching, which has a tensile strength at least as great as that of the webbing itself.

An object of the present invention, therefore, resides in a new and unique method of stitching together two layers of high tensile strength webbing.

A further object of the invention provides an improved and yet simple method of securing together adjacent sections of webbing in a manner that greatly increases the strength of the stitched webbing sections.

A still further object of the invention utilizes a webbing having a high tensile strength up to 40,000 lbs. in which overlapping sections thereof are stitched together by a novel method ensuring that the webbing itself will fail first.

Another object of the invention involves the fabrication of a unique article of webbing sewed together in such an improved manner that the seams thereof are even stronger than the webbing itself.

Other objects and advantages of the invention will become apparent from the following description taken in connection with the accompanying drawings in which like reference characters refer to like parts in the several figures:

Fig. 1 is a top view of a section of the tow webbing utilized in the invention, illustrating the arrangement of overlapping rows of stitches utilized in the invention.

Fig. 2 is an elevational view of the tow webbing of Fig. 1, illustrating the variation in the amount of slack sewn into each seam.

Fig. 3 is a second top view illustrating the arrangement of a plurality of the tow webbings of Figs. 1 and 2 as utilized with the B–36-type aircraft.

Fig. 5 is a top view of the tow webbing attachment utilized with the invention of Figs. 1–4.

Fig. 6 is a view taken on section 6—6 of Fig. 5, illustrating the details of the webbing attachment of the tow vehicle.

Figure 4:
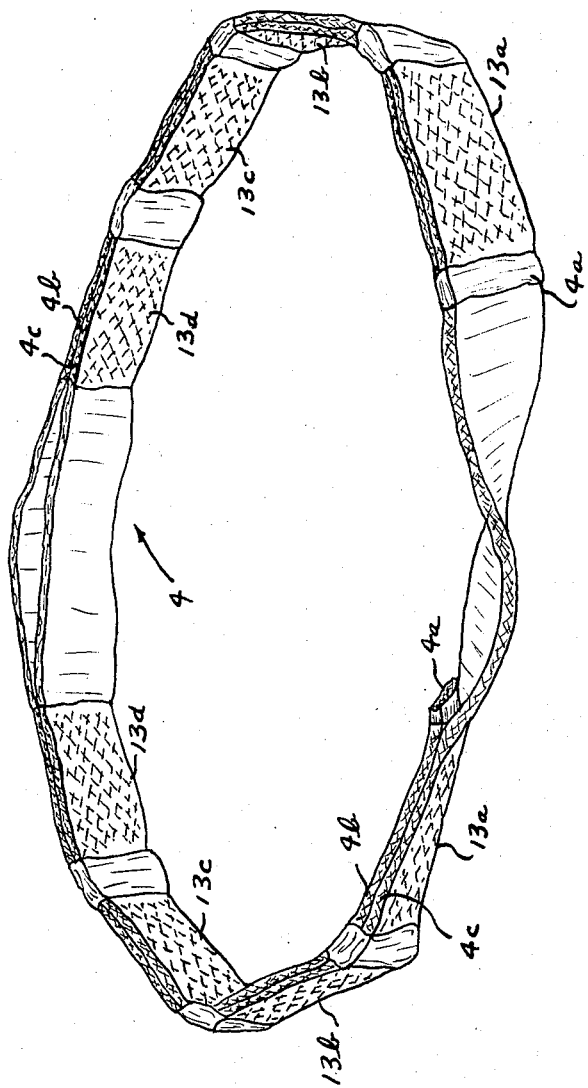
Fig. 4 is a perspective view of a sample of the tow webbing of Figs. 1–3, illustrating a total of eight overlapping sections stitched together in accordance with the invention.

Referring specifically to Fig. 3 of the drawings, the tow webbing of the invention indicated generally at 1 is shown utilized as an attachment for towing a simulated crashed B–36-type aircraft for purposes of testing the strength of the inventive stitching incorporated in tow webbing 1. Partially broken away views of the aircraft wing and tail surfaces are indicated at 2 and 3, respectively. In the text, a B–36-type aircraft was successfully dragged by the attachment of six webbing loops, three of which are indicated at 4, of 392 feet in length, placed around the wing surfaces 2 and, in addition, the attachment of three identical webbing loops 5, of 292 feet in length, placed around the tail surfaces 6. Each of said loops 4, 5 consists of nylon webbing having a high tensile strength of 40,000 lbs. and each is stitched in overlapping layers in accordance with the inventive method, which will be explained in detail hereinafter. Moreover, each of said loops 4, 5 is attached at one end to a tow vehicle indicated generally at 7 and described in detail hereinafter. It is noted that the opposite ends of said loops 4, 5 are attached to a total of three such tow vehicles 7, only two of which are illustrated.

With particular reference to Figs. 5 and 6 of the drawings, an enlarged view of one of the tow vehicles 7 of Fig. 3 is shown. Only one is shown since all three are identical. Moreover, the following description is had with reference to webbing loop 4 only since all the loops utilized incorporate the same invention. Said webbing loop 4 is attached to tow vehicle 7 by means of a tow webbing attachment 8, which attachment 8 consists of a relatively flat plate-like element 8a arcuate on its trailing edge and straight on its forward or leading edge when viewed in Fig. 5, and a pair of parallel, spaced, somewhat triangular-shaped flat side pieces 8b affixed to said plate-like element 8a in overlapping relation and at right angles thereto. Said plate-like element 8a is rotatably connected to tow vehicle 7 at 8c. Between said side pieces 8b are rotatably positioned a pair of drums 9 and 9a, which drums 9 and 9a are, as seen clearly in Fig. 6, mounted in a vertical plane with one above the other. Each of said drums 9 and 9a is divided as shown in Fig. 5 to provide for three separate webbing loops 4. Each of said loops 4 is first placed on the upper drum 9, is then passed around the aircraft surfaces, and finally returned back to the lower drum 9a directly underneath upper drum 9. In testing the strength of said webbing loops 4 and the stitches utilized therein, the B–36-type aircraft was loaded to weigh a total of 480,000 lbs. and was resting on its fuselage on a concrete surface.

Referring particularly to Figs. 1, 2 and 4 of the drawing, reference is now made to the specific method of stitching together the webbing loops 4 of the present invention. Said webbing loops 4 are three inches in width and may be of any desired length. In the test run on the B–36-type aircraft, six loops of 392 feet in length and three loops of 292 feet in length were utilized and attached around the wings and tail assembly, respectively. As seen clearly in said Figs. 1 and 2, a test sample webbing 4 is illustrated. Said webbing 4 is identical, except for its length, to that used for dragging the B–36-type aircraft, as previously described. Description hereinafter made is with reference to said test sample, but it is to be understood that the method of stitching used with the latter sample is identical to webbing loop 4 utilized for dragging or towing the B–36-type aircraft. Said webbing loop 4 consists of a loop approximately 90 inches in length and, as previously stated, has a high tensile strength of 40,000 lbs. The loop is formed by overlapping the dead ends indicated at 4a of webbing 4 to form double layers 4b and 4c as clearly seen in Figs. 2 and 4. Said double layers 4b, 4c are overlapped along the length of webbing 4 for a distance of approximately 39½ inches. One end of the webbing loop 4 is shown engaged with a drum (5" diameter) 10 which drum 10 represents the aircraft to be towed, and the opposite end of webbing loop 4 is engaged with a second drum 11 which drum 11 is mounted on a test machine (not shown). In order to properly strengthen the seam on both sides of the loop, stitches forming a plurality of spaced seams indicated at 12 are sewn into each dead end side. A total of four seams 12 are illustrated as incorporated on each side of webbing loop 4. Prior to the sewing of stitches 12 into each side of said loop 4, the latter is divided lengthwise along both sides into four unequal portions 13a, 13b, 13c and 13d, respectively. Each of said portions is compressed and the slack effected thereby sewn therein to form a seam 12. With the above-described sample webbing 4, the original length of said seams 13a, 13b, 13c and 13d is 6.9", 6.6", 6.3" and 6", respectively. Beginning at the dead end 4a, slack is sewn into each seam on both sides of webbing loop 4 by compressing the original length of each seam 13a, 13b, 13c and 13d, 15%, 10%, 5% and 0%, respectively, or with the lengths specified above for the test sample webbing 4, each of said seams 12 is compressed into six inches, and then stitched as shown in Fig. 1. As clearly seen in said Figure 1, eight rows of overlapping stitches are made to form each seam 13a, 13b, 13c, 13d. Through extensive experimentation and tests, it has been determined that the largest stress under high tensile loads occurs in the seam nearest the dead end 4a and for this reason, the largest amount of slack (15%) is sewn into the webbing loop 4 on the dead end side with successively decreasing amounts as specified above sewn into webbing loop 4 in the remaining three seams on each side thereof. The amount of slack specified above was determined to be necessary in order to distribute or space more evenly the stress over the entire seams. With the above arrangement of sewing in slack in seams 13a, 13b and 13c, webbing loop 4 now withstands forces somewhat in excess of 80,000 lbs. and, in fact, extensive tests showed that the webbing loop 4 itself breaks or fails before any of the seams 13a, 13b, 13c or 13d fail so that a change is now made in the factor of safety by basing it on the strength of the webbing 4 rather than that of either seam. Thus, as tension is applied to webbing loop 4, each sewed section 13a, 13b, 13c and 13d stretches proportionally to the force applied and therefore effecting an evenly distributed stress-strain relationship over the entire loop.

It is to be emphasized that, although the above description is made with reference to a specific sample webbing 4 and to a specific arrangement thereof relative to the towing of B-36-type aircraft, it is to be understood that such places no limitation on the invention and that the inventive method of fabrication disclosed hereinbefore could be used in all types of fabrication work dealing with textile materials, all types of webbings, and in parachute work, for example. The determination of the amount of sewn in slack used in the particular tests was based upon measurements taken during prestressing of the test samples utilized.

Thus, a new and unique method of fabricating webbing has been accomplished by the invention in which it is assured that said webbing withstands forces at least up to its maximum strength. Furthermore, an improved and yet simple method has been devised by the present invention of sewing in seams in said webbing loop 4 that will not fail prior to the webbing itself failing.

What is claimed is:

1. An improved method of fabricating webbing strips consisting in overlapping predetermined sections of said strips to form a loop having a double-layer and alternate dead ends on each side thereof, dividing each dead end side into a plurality of unequal spaced segments, compressing each of said segments into an equal, predetermined length along each dead end side of said loop, and stitching a seam into each of said segments incorporating slack formed therein by said compressing of said segments to evenly distribute stress along each of said seams when said loops is placed under high tensile loads.

2. Means for towing a crashed vehicle comprising a relatively narrow webbing loop of high tensile strength attached at one end to the crashed vehicle and incorporating a seamed joint having a tensile strength at least equal to that of said webbing loop and comprising dead ends stitched together in overlapped layers and incorporating a predetermined slack therein progressively resisting increasing tensile loads applied to said webbing loop, and a tow vehicle having attachment means affixed to the other end of said webbing loop, said attachment means comprising a tow webbing attachment including a relatively flat plate-like element rotatably affixed to the tow vehicle and having an arcuate trailing edge and a straight forward edge, a pair of parallel spaced somewhat triangular shaped side pieces fixed to said flat, plate-like element, and a pair of vertically disposed drums rotatably mounted between said side pieces, each of said drums being divided to receive a plurality of said webbing loops.

3. An improved method for forming webbing fabric of high tensile strength into a tow-line loop having a seamed joint of equal strength consisting in overlapping portions of webbing fabric, compressing said overlapped portions into a plurality of separated sections from 5 to 20% of their relaxed length to form predetermined slack therein, and stitching said slack in a plurality of rows into each of said compressed portions to substantially increase the tensile strength of said seamed joint.

4. An improved method for equalizing the tensile strength of a seamed joint formed in a webbing loop utilized as a tow-line for dragging very heavy loads consisting in folding predetermined lengths of a webbing strip upon each other to form a webbing loop having a double layer of fabric material extending over a substantial part of its circumference and terminating in a pair of dead ends on opposite sides of said loop, selecting predetermined spaced sections along the length of said double-layer on opposite dead end sides of said loop, forming slack in each of said spaced sections, and stitching the slack in said sections into a plurality of seamed joints, each incorporating slack between the stitches therein progressively resisting separation between the double-layer fabric material of said webbing loop at a minimum tensile strength equal to that of said fabric material.

5. An improved method for equalizing the tensile strength of a seamed joint formed in a webbing loop as in claim 4, said slack being formed into said plurality of seamed joints by compressing said spaced sections from 5 to 15%, respectively, beginning with the section remote from said dead end.

References Cited in the file of this patent

UNITED STATES PATENTS

| 1,418,783 | Fokker | June 6, 1922 |
| 1,738,374 | Krechmer | Dec. 3, 1929 |
| 2,681,019 | Liebowitz | June 15, 1954 |
| 2,681,020 | Liebowitz | June 15, 1954 |
| 2,747,891 | Neff | May 22, 1956 |
| 2,801,114 | Chapman | July 30, 1957 |